United States Patent Office 3,627,470
Patented Dec. 14, 1971

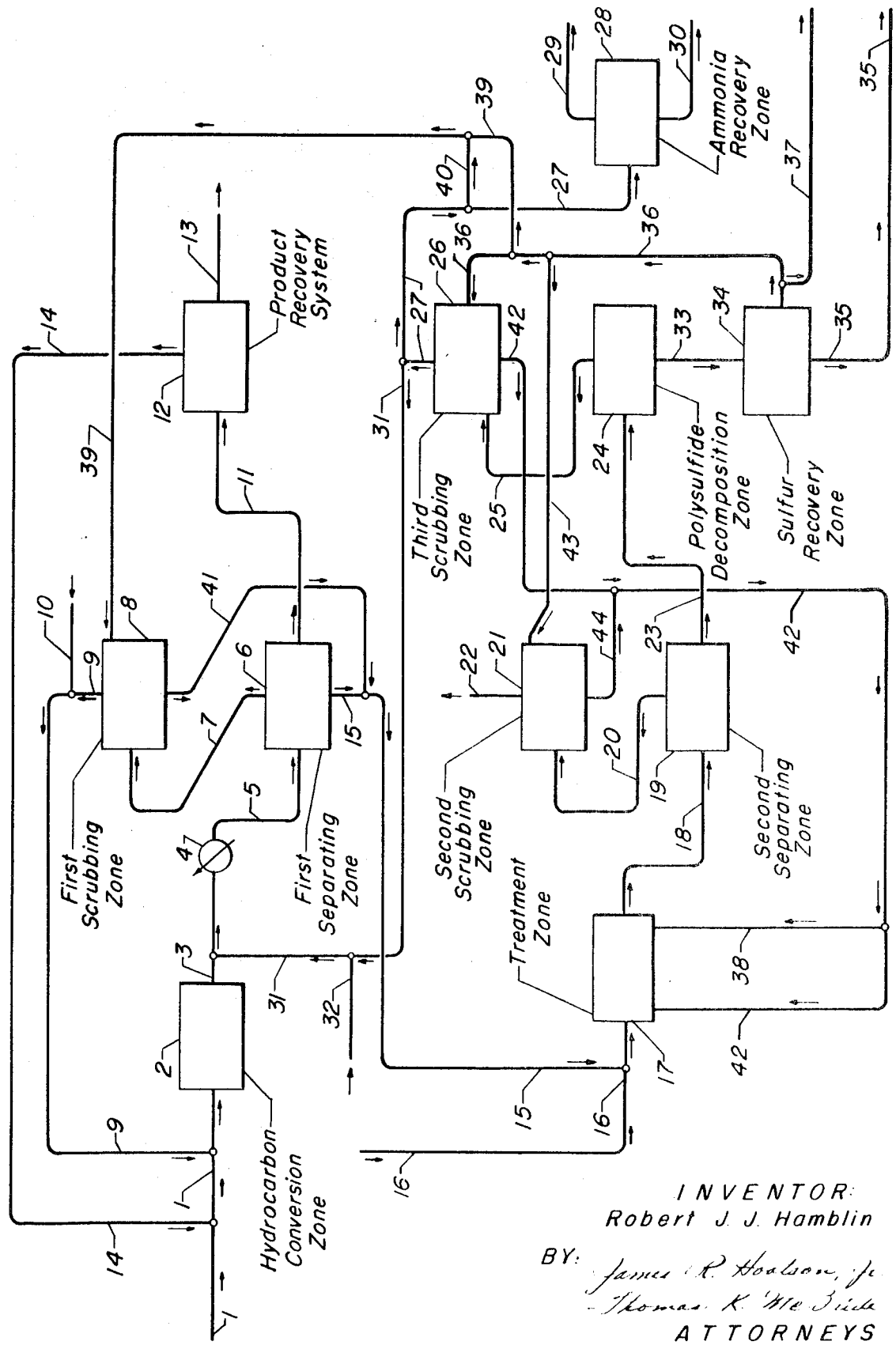

3,627,470
COMBINATION OF A HYDROCARBON CONVERSION PROCESS WITH A WATER TREATING PROCESS FOR RECOVERY OF AMMONIA AND SULFUR
Robert J. J. Hamblin, Deerfield, Ill., assignor to Universal Oil Products Company, Des Plaines, Ill.
Filed Dec. 23, 1968, Ser. No. 786,155
Int. Cl. C01b 17/00, 21/00; C01c 1/00
U.S. Cl. 23—193                                   10 Claims

ABSTRACT OF THE DISCLOSURE

A hydrocarbon charge stock containing sulfurous and nitrogenous contaminants is converted and elemental sulfur and an ammoniacal aqueous stream are simultaneously recovered by the steps of: (a) contacting the hydrocarbon charge stock and a hydrogen stream with a hydrocarbon conversion catalyst at conversion conditions sufficient to form an effluent stream containing substantially less sulfurous and nitrogenous contaminants, hydrocarbons, hydrogen $NH_3$ and $H_2S$; (b) then mixing this effluent stream with a substantially thiosulfate-free recycle water stream containing $NH_4OH$: (c) cooling and separating the resulting mixture to produce a gas stream containing hydrogen and $H_2S$, a hydrocarbon stream and a water stream containing $NH_4HS$; (d) scrubbing the $H_2S$ from the gas stream with a recycle water stream containing $NH_4OH$ and $(NH_4)_2S_2O_3$ to form a purified hydrogen stream and an aqueous bottom stream containing $NH_4HS$ and $(NH_4)_2S_2O_3$; and (e) treating the water stream from step (c) and the aqueous bottom stream from step (d) to produce elemental sulfur and an aqueous ammoniacal product stream and to form the recycle water streams used in step (b) and in step (d).

A feature of my combination invention is the use of the treating step to produce a thiosulfate-free ammoniacal water stream for recycle to the water-contacting step of the hydrocarbon conversion process, coupled with the production of a thiosulfate-containing ammoniacal recycle water stream which is used to purify the hydrogen recycle stream thereby enabling the conversion process to be operated with less hydrogen recycle compressor capacity, minimizing sulfur corrosion problems both in the hydrocarbon conversion process and in the associated product recovery system, and eliminating complex equipment such as is typically used in existing hydrocarbon conversion plants producing $H_2S$ as a side product, to recover elemental sulfur via an amine scrubbing step coupled with a Claus-type vapor phase oxidation step. In addition, the combination process minimizes water pollution problems in the vicinity of the hydrocarbon conversion process and enables a substantial reduction in water requirements for this process.

The subject of the present invention is a combination process directed towards the catalytic conversion of a hydrocarbon charge stock containing sulfurous and nitrogenous contaminants with continuous recovery of substantially all of the hydrogen sulfide and ammonia contained in the products from the hydrocarbon conversion step without causing any substantial water pollution problems. More precisely, the present invention relates to processes for the conversion of hydrocarbon charge stocks containing sulfurous and nitrogenous contaminants wherein the products from the hydrocarbon conversion step include $NH_3$ and $H_2S$ and wherein it is desired to convert substantially all of the $H_2S$ produced into elemental sulfur while simultaneously purifying a hydrogen recycle stream and abating a waste water pollution problem that is typically caused in these processe by virtue of the fact that a water stream must be continuously utilized to keep the conversion step effluent condensor free of ammonium hydrosulfide salts.

The concept of the present invention developed from my efforts directed towards a solution of a substantial water pollution problem that is caused when a water stream is used to remove ammonium hydrosulfide salts from the effluent equipment train associated with such hydrocarbon conversion processes as hydrorefining, hydrocracking, etc., wherein ammonia and hydrogen sulfide side products are produced. The original purpose for injecting this water stream into the effluent train of heat transfer equipment associated with these processes was to remove these detrimental salts in order to prevent them from clogging up the equipment. Moreover, the use of this water stream increases the efficiency of the heat transfer equipment due to the vaporization of a portion of the water. The water stream recovered from the heat transfer equipment presents a substantial pollution hazard insofar as it contains sulfide salts which have a substantial biological oxygen demand and ammonia which is a nutrient that leads to excessive growth of stream vegetation. One solution commonly used in the prior art to cointrol this pollution problem is to strip a gas stream containing $NH_3$ and $H_2S$ from this water stream with resulting recycle of the stripped water to the effluent equipment train and recovery of elemental sulfur from the stripped gases via a Claus-type oxidation step. Another solution is to sufficiently dilute the recovered water stream so that the concentration of sulfide salts is reduced to a level wherein it is relatively innocuous and to discharge the diluted stream into a suitable sewer. Still another approach to the solution of this problem has been directed towards a water treating process which would allow recovery of the commercially valuable elemental sulfur and ammonia directly from this water stream by a controlled oxidation method. However, despite careful and exhaustive investigations of alternative methods for direct oxidation of the sulfide salts contained in this water stream, it has been determined that an inevitable side product of the oxidation step appears to be ammonium thiosulfate. The presence of ammonium thiosulfate in the treated aqueous stream recovered from the water treating step presents a substantial problem because for efficient control of the water pollution problem and in order to have a minimum requirement for make-up water, it is desired to operate the combination of the hydrocarbon conversion plant and the waste water treating plant with a closed water loop. That is, it is desired to continuously recycle the treated water stream back to the hydrocarbon conversion process in order to remove additional quantities of detrimental sulfide salts. The presence of ammonium thiosulfate in this treated aqueous stream prevents the direct recycling of this stream back to the condensor for the effluent stream from the hydrocarbon conversion step primarily because the ammonium thiosulfate can react with the hydrogen sulfide contained in the effluent stream to produce elemental sulfur, with resulting contamination of the hydrocarbon product stream with free sulfur which, in turn, causes severe corrosion problems in downstream equipment and degrades hydrocarbon product quality. In addition, ammonium thiosulfate is non-volatile and can contribute to salt formation in the heat transfer equipment which is a result directly contrary to the desired results. I have now found a convenient and efficient method for combining a water treating process with a hydrocarbon conversion process which enables not only the continuous recycle of a treated water stream back to the water contacting step of the hydrocarbon conversion process, but, more significantly, allows the hydrogen stream which is separated from the products from the hydrocarbon conversion step to be purified with resulting improvement in the performance of the hydrocarbon conversion step and elimination of the traditional sulfur recovery system, comprising an amine scrubbing step coupled with a Claus conversion step. In essence, my invention involves operating the water treating process to produce not only a thiosulfate-containing water stream, but, in addition, to produce an aqueous, ammoniacal stream which is substantially free of both thiosulfate and sulfide salts, and coupling this treatment method with the hydrocarbon conversion process at three points: the first being the use of a portion of an aqueous ammoniacal stream in the effluent water-contacting step of the hydrocarbon conversion process, the second being the use of the thiosulfate-containing stream in a separate hydrogen scrubbing step and the third being the charging of the effluent water stream from the water-contacting step and the scrubbing step to the water treating process.

It is, accordingly, an object of the present invention to provide a combination process for converting a hydrocarbon charge stock containing sulfurous and nitrogenous contaminants and for simultaneously recovering sulfur and an ammonia-containing stream. A second object is to eliminate one source of waste water streams that cause water pollution problems in the vicinity of petroleum refineries. A third object is to substantially reduce or eliminate the requirement for fresh water or make-up water for the operation of a hydrocarbon conversion process wherein hydrogen sulfide and ammonia are produced as side products. Another object is to provide a combination process wherein a water stream containing ammonium hydrosulfide is produced in a hydrocarbon conversion process, wherein this water stream is treated to recover sulfur and to produce a treated aqueous stream containing ammonium thiosulfate and an ammoniacal aqueous stream which is substantially free of thiosulfate and wherein these last two streams are utilized in the water-contacting step and a hydrogen scrubbing step, respectively, of the hydrocarbon conversion process. Still another object is to provide a combination of a hydrocarbon conversion process and a water treating process which allows the purification of a hydrogen recycle stream containing $H_2S$ in order to subsantially reduce compressor capacity requirements for the hydrocarbon conversion process. Yet another object is to provide a combination of a hydrocarbon conversion process and a waste water process which enables the conversion of substantially all of the hydrogen sulfide produced in the hydrocarbon conversion step to elemental sulfur, thereby eliminating the conventional requirement for a sulfur recovery system which typically comprises an amine scrubbing step coupled with a Claus-type oxidation step.

In one embodiment, the present invention is a combination process for converting a hydrocarbon charge stock containing sulfurous and nitrogenous contaminants and for simultaneously recovering elemental sulfur and an ammoniacal aqueous stream where substantially all of the $H_2S$ and $NH_3$ produced in the hydrocarbon conversion step is recovered via an interconnected waste water treating method. The first step of this combination process involves contacting, in a hydrocarbon conversion zone, the hydrocarbon charge stock and a hydrogen stream with a hydrocarbon conversion catalyst at conversion conditions sufficient to form an effluent stream containing substantially less sulfurous and nitrogenous contaminants, hydrocarbons, hydrogen, $NH_3$ and $H_2S$, the effluent stream containing substantially more mols of $H_2S$ than $NH_3$. In the second step, a first recycle water stream containing $NH_4OH$ and being substantially free of thiosulfate is mixed with the effluent stream from the first step. The resulting mixture is then, in the third step, cooled and separated to form a gas stream containing $H_2$ and $H_2S$, a hydrocarbon stream, and a water stream containing $NH_4HS$. The fourth step involves contacting, in a first scrubbing zone, the gas stream from the third step with a second recycle water stream containing $NH_4OH$ and $(NH_4)_2S_2O_3$ to form an overhead hydrogen stream which is substantially free of $H_2S$, and an aqueous bottom stream containing $NH_4HS$ and $(NH_4)_2S_2O_3$. In the fifth step, the hydrogen stream from the fourth step is commingled with a makeup hydrogen stream and the resulting mixture passed to the first step in order to provide the hydrogen stream therefor. In the sixth step, a mixture of the water stream from the third step, the aqueous bottom stream from the fourth step, an air stream, and a third recycle water stream containing $NH_4OH$, $NH_4HS$ and $(NH_4)_2S_2O_3$ is contacted with a solid catalyst at oxidizing conditions sufficient to produce an effluent stream containing ammonium polysulfide, $NH_4OH$, $(NH_4)_2S_2O_3$, $H_2O$, $N_2$ and unreacted $NH_4HS$. The seventh step comprises separating the effluent stream from the sixth step into a gas stream containing $N_2$, $H_2O$, $H_2S$ and $NH'$ and a water stream containing ammonium polysulfide, $NH_4OH$ and

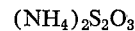

In the eighth step, the water stream from the seventh step is subjected to polysulfide decomposition conditions effective to produce an overhead vapor stream containing $NH_3$, $H_2S$ and $H_2O$ and a bottom water stream containing elemental sulfur and $(NH_4)_2S_2O_3$. The ninth step involves separating sulfur from the bottom water stream from the eighth step to form a water stream containing a minor amount of $(NH_4)_2S_2O_3$. In the tenth step, a first portion of the water stream from the ninth step is contacted with the gas stream from the seventh step, in a second scrubbing zone, to form a nitrogen-rich overhead gas stream which is vented from the process, and an aqueous bottom stream containing

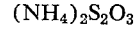

$NH_4OH$ and $NH_4HS$. Similarly, in the eleventh step, a second portion of the water stream from the ninth step is contacted, in a third scrubbing zone, with the overhead vapor stream from the eighth step to form a substantially sulfide-free and thiosulfate-free overhead stream containing $NH_4OH$ and $H_2O$, and an aqueous bottom stream containing $NH_4OH$, $(NH_4)_2S_2O_3$ and $NH_4HS$. In the twelfth step, the bottom streams from the tenth and eleventh steps are combined to form the third recycle water stream and it is passed to the sixth step. In the thirteenth step, a third portion of the water stream from the ninth step is combined with a first portion of the overhead stream recovered from the eleventh step to produce the second recycle water stream and the resulting stream is passed to the fourth step. The fourteenth step comprises recovering a second portion of the overhead stream from the eleventh step as the first recycle water stream and returning same to the second step. And the final step comprises recovering the remaining portion of the overhead water stream from the eleventh step as an ammoniacal, aqueous product stream.

In a second embodiment, the process of the present invention encompasses a combination process as outlined above in the first embodiment wherein the hydrocarbon conversion catalyst utilized in the first step comprises a metallic component selected from the metals and compounds of the metals of Group VI–B or Group VIII combined with refractory inorganic oxide carrier material.

In a third embodiment, the present invention is the combination process described above in the first embodiment wherein the solid catalyst utilized in the sixth step is a phthalocyanine catalyst.

In another embodiment, the present invention comprises the combination process as outlined in the first embodiment wherein the solid catalyst utilized in the sixth step comprises an iron group metallic sulfide combined with a carrier material.

Other objects and embodiments are hereinafter disclosed in the following discussion of the input streams, the output streams, and the mechanics associated with each of the essential steps of the present invention.

As indicated above, the first step of the present invention involves the catalytic conversion of a hydrocarbon charge stock containing sulfurous and nitrogenous contaminants in amounts such that the amount of $H_2S$ liberated therefrom in the subsequent conversion step is greater than the amount of $NH_3$ produced on a mol basis. The scope of this step is intended to embrace all catalytic petroleum processes which utilize hydrogen in the presence of a hydrocarbon conversion catalyst to react with sulfur and nitrogen compounds contained in the charge stock to produce, inter alia, $H_2S$ and $NH_3$. Generally, in these processes, the hydrocarbon charge stock containing the sulfurous and nitrogenous contaminants and a hydrogen stream are simultaneously contacted with a hydrocarbon conversion catalyst comprising a metallic component selected from the metals and compounds of the metals of Group VI–B (principally molybdenum and tungsten) or Group VIII combined with a refractory inorganic oxide carrier material at conversion conditions, including an elevated temperature and superatmospheric pressure, sufficient to produce an effluent stream containing substantially less nitrogenous and sulfurous contaminants, hydrocarbons, hydrogen, $H_2S$, and $NH_3$. One example of a preferred conversion process, included within the scope of this first step, is the process known in the art as hydrorefining, hydrotreating or hydrodesulfurization. The principal purpose of a hydrorefining process is to desulfurize a hydrocarbon charge stock charged thereto by a mild treatment with hydrogen which generally is selective enough to saturate olefinic-type hydrocarbons and to rupture carbon-nitrogen and carbonsulfur bonds but is not severe enough to saturate aromatics. The charge to the hydrorefining process is typically a charge stock boiling in the range of about 100° F. to about 650° F. such as a gasoline boiling range charge stock or a kerosene boiling range charge stock or a heavy naphtha, which charge stock contains minor amounts of sulfurous and nitrogenous contaminants which are to be removed without causing any substantial amount of cracking or hydrocracking. The hydrorefining catalyst utilized is preferably used as a fixed bed in the conversion zone and typically comprises a metallic component selected from the transition metals and compounds of the transition metals of the Periodic Table. In particular, a preferred hydrorefining catalyst comprises an oxide or sulfide of a Group VIII metal, especially an iron group metal, mixed with an oxide or sulfide of a Group VI–B metal, especially molybdenum or tungsten. These metallic components are preferably combined with a carrier material which generally is characterized as a refractory inorganic oxide such as alumina, silica, zirconia, titania, etc. Mixtures of these refractory inorganic oxides are generally also utilized, especially mixtures of alumina and silica. Moreover, the carrier materials may be synthetically prepared or naturally occurring materials such as clays, bauxite, etc. Preferably, the carrier material is not made highly acidic. A preferred hydrorefining catalyst comprises cobalt oxide or sulfide and molybdenum oxide or sulfide combined with an alumina carrier material containing a minor amount of silica. Suitable conditions utilized in this first step in the hydrorefining mode are: a temperature in the range of about 600 to about 900° F., a pressure of about 100 to about 3000 p.s.i.g., a liquid hourly space velocity of about 20 hr.$^{-1}$ and a hydrogen to oil ratio of about 200 to about 1 to about 10,000 standard cubic feet of hydrogen per barrel of charge stock.

Another example of the type of conversion process which is preferably utilized as the first step of the present invention is a hydrocracking process. The principal objective of this type of process is not only to effect hydrogenation of the charge stock but also to effect selective cracking or hydrocracking. In general, the hydrocarbon charge stock, when the first step is a hydrocracking step, is a stock boiling above the gasoline range such as straight-run gas oils, lubricating oils, coker gas oils, cycle oils, slurry oils, heavy recycle stocks, crude petroleum oils, reduced and/or topped crude oils, etc. Furthermore, these hydrocarbon charge stocks contain minor amounts of sulfurous and nitrogenous contaminants which may range from about 100 p.p.m. sulfur to 3 or 4 wt. percent sulfur or more; the nitrogen concentration in this charge stock is typically substantially less than the sulfur concentration. The hydrocracking catalyst utilized generally comprises a metallic component selected from the metals and compounds of metals of Group VI–B and Group VIII combined with a refractory inorganic oxide. Particularly preferred metallic components comprise the metals, oxides or sulfides of molybdenum and tungsten from Group VI–B and iron, cobalt, nickel, platinum and palladium from Group VIII. The preferred refractory inorganic oxide carrier material is a composite of alumina and silica, although any of the refractory inorganic oxides mentioned hereinbefore may be utilized as a carirer material if desired. Since it is desired that the catalyst possess a cracking funciton, the acid activity of these carrier materials may be further enhanced by the incorporation of small amounts of acidic materials such as fluorine and/or chlorine. In addition, in some cases it is advantageous to use as or include within the carrier material a crystalline aluminosilicate which is usually in an activated state such as the hydrogen form or in a rare earth exchanged form. Preferred aluminosilicates are the Type X and Type Y forms a faujasite, although any other suitable aluminosilicate, either naturally occurring or synthetically prepared, may be utilized if desired. Conditions utilized in the first step when it is operated in the hydrocracking mode include: a temperature of about 500 to about 1000° F., a pressure in the range of about 300 to about 5000 p.s.i.g., a liquid hourly space velocity of about 0.5 to about 15.0 hr.$^{-1}$ and a hydrogen to oil ratio of about 1000 to about 20,000 standard cubic feet of hydrogen per barrel of oil.

Regardless of the details concerning the exact type of hydrocarbon conversion performed in the first step, the effluent stream recovered therefrom contains substantially less nitrogenous and sulfurous contaminants, hydrocarbons, hydrogen, $NH_3$ and $H_2S$, the amount of $H_2S$ being greater than the amount of $NH_3$ on a mol basis. It is an essential feature of the present invention that this effluent stream is contacted with a first recycle water stream containing $NH_4OH$ and being substantially free of thiosulfate prior to cooling of this effluent stream to a lower temperature. This first recycle water stream is obtained from the water treating step as will be hereinafter explained. As discussed previously, the uniform practice of the prior art has been to inject sufficient water into the effluent stream from the first step upstream of the effluent heat exchange equipment in order to wash out ammonium sulfide salts that would be otherwise produced when this effluent is cooled to a temperature below about 200° F. During start up of the combination process of the present invention, a fresh water stream may be added to the effluent stream from the hydrocarbon conversion step in order to provide the initial inventory of water circulating in the combination process; however, it is a feature of the present invention that once the combination process is started-up and lined-out, sufficient water will be recovered from the treating step to supply the amount needed in this water contacting step, thereby eliminating the requirements for continuous addition of fresh water. The amount of water utilized in this water contacting step is obviously a pronounced function of the amount of $NH_3$ and $H_2S$ in this effluent stream; typically, it is an amount sufficient to prevent clogging of the heat transfer equipment and ordinarily an amount of about 1 to about 20 or more gallons of water per hundred gallons of oil charged to the hydrocarbon conversion step is found to be sufficient.

Following the water-contacting step, the resulting mixture is cooled in any suitable cooling means and then separated in any suitable separating means, to form a gas stream containing $H_2$ and $H_2S$, a hydrocarbon stream and a water stream containing $NH_4HS$. Typically, this first separation step is performed at a temperature of about 50 to about 150° F. and at a pressure which is approximately equal to the pressure utilized in the hydrocarbon conversion step. The gas stream formed in this separating step will generally consist of about 60 to 95 mol percent hydrogen, about 5 to about 30 mol percent $H_2S$, a very minor amount of $NH_3$ and some light hydrocarbons. The hydrocarbon stream will contain substantially all of the hydrocarbons contained in the effluent stream from the hydrocarbon conversion step; it is typically passed to a suitable product recovery system which generally, for the type of hydrocarbon conversion processes within the scope of the present invention comprises a suitable train of fractionating equipment designed to separate this hydrocarbon-rich product stream into a series of desired hydrocarbon products, some of which may be recycled.

The amount of $NH_4HS$ contained in the water stream formed in the first separating step may vary over a wide range up to the solubility limits of the sulfide salt in water at the conditions maintained in the separating step. Typically, the amount of $NH_4HS$ calculated as sulfur is about 1.0 to about 10.0 wt. percent of the water stream. For example, a typical water stream from a hydrocracking plant contains about 3.7 wt. percent sulfur as $NH_4HS$. In addition, this aqueous waste stream may in some cases contain excessive amounts of $NH_3$ relative to the amounts of $H_2S$ absorbed therein, but it will rarely contain more $H_2S$ than $NH_3$ because of the relatively low solubility of $H_2S$ in an aqueous solution containing a molar ratio of dissolved $H_2S$ to dissolved $NH_3$ greater than about 1:1.

According to the present invention, the fourth step of the combination process involves contacting, in a first scrubbing zone, the gas stream recovered from this first separation step with a second recycle water stream containing $NH_4OH$ and $(NH_4)_2S_2O_3$. In general, this first scrubbing step can be effected in any suitable contacting means designed to achieve intimate contact between the gas stream and the water stream, and normally this involves the use of a vertically positioned tower with the gas stream being countercurrently contacted with the water stream to produce a purified hydrogen stream which leaves the tower near the top thereof and a fat aqueous bottom stream containing $NH_4HS$ and $(NH_4)_2S_2O_3$ which leaves the tower near the bottom thereof. Customarily, the contacting tower is supplied with means for increasing contact between the phases such as plates, baffles, or other suitable contacting means. Preferably, this first scrubbing zone is operated at conditions which are substantially equivalent to the conditions utilized in the separating step. Furthermore, the amount of the second recycle water stream charged to this scrubbing step is preferably sufficient to provide about 1 to about 2 mols of $NH_4OH$ per mol of $H_2S$ contained in the gas stream. Typically, this contacting step can be operated to effect the removal of about 80 to 95% or more of the $H_2S$ contained in the gas stream charged to this step.

Following this first scrubbing step, the purified hydrogen stream recovered therefrom is commingled with a makeup hydrogen stream in an amount sufficient to make up for the amount of $H_2$ used in the hydrocarbon conversion and separation zones and the resulting mixture passed through suitable compressing means back to the hydrocarbon conversion step. In the past, some hydrocarbon conversion plants have purged a portion of the hydrogen-rich gas stream recovered from the separating step in order to remove at least a portion of the net $H_2S$ production and to reduce the $H_2S$ partial pressure in the hydrocarbon conversion zone; however, it is a feature of the present invention that no purging of a portion of the gas stream from the hydrogen recycle loop is necessary.

Returning to the water stream formed in the first separating step, it is combined with the aqueous bottom stream from the first scrubbing zone and the resulting mixture passed to a treating step wherein it is catalytically treated with oxygen at oxidizing conditions. In some cases, it is advantageous to remove dissolved or entrained oil or solids contained in the resulting mixture by any suitable oil skimming procedure prior to passing this mixture to the oxygen treating step; however, in most cases this mixture may be charged directly to the treating step. Preferably, a third recycle water stream containing $NH_4OH$, $NH_4HS$ and $(NH_4)_2S_2O_3$ is also charged to this treating step in admixture with the two water streams hereinabove mentioned. The principal reason for ultilizing this recycle stream is to return unreacted sulfide to the treatment step.

The catalyst utilized in the treating step is any suitable solid catalyst that is capable of effecting conversion of the ammonium hydrosulfide salt contained in the mixture of water stream charged thereto. Two particularly preferred classes of catalyst for this step are metallic sulfides, particularly iron group metallic sulfides and metal phthalocyanines. The metallic sulfide catalyst is selected from the group consisting of sulfides of nickel, cobalt and iron, with nickel being especially preferred. Although it is possible to perform this step with a slurry of the metallic sulfide, it is preferred that the metallic sulfide be composited with a suitable carrier material. Examples of suitable carrier materials are: charcoal, such as wood charcoal, bone charcoal, etc. which may or may not be activated prior to use; either naturally occuring or synthetically prepared refractory inorganic oxides such as alumina, silica, zirconia, kieselguhr, bauxite, etc.; activated carbons such as those commonly available under trade names of Norit, Nuchor, etc.; and other natural or synthetic highly porous carrier materials. The preferred carrier materials are alumina, patricularly gamma or eta alumina, and activated carbon. Thus, preferred catalysts are nickel sulfide combined with alumina or nickel sulfide combined with activated carbon. It is generally preferred that the metallic component of this combination catalyst be sufficient to constitute about 0.5 to 35 wt. percent of the final composite, calculated as the metal, with a value of about 1 to 15 wt. percent being preferred.

Another preferred catalyst for use in this treatment step is a metal phthalocyanine compound combined with a suitable carrier material. Particularly preferred metal phthalocyanine compounds include those of cobalt and vanadium. Other metal phthalocyanine compounds that may be used include those of iron, nickel, copper, molybdenum, manganese, tungsten, and the like. Moreover, any suitable derivative of the metal phthalocyanine may be employed including the sulfonated derivatives and the carboxylated derivatives. Any of the carrier materials previously mentioned in connetion with the metallic sulfide catalyst can be utilized with the phthalocyanine catalyst; however, the preferred carrier material is activated carbon. Hence, a particularly preferred catalyst for use in the treatment step compises a cobalt phthalocyanine sulfonate combined with an activated carbon carrier material. Additional details as to alternative carrier materials, methods of preparation, and the preferred amounts of catalytic components are given in the teachings of U.S. Pat. No. 3,108,081 for these phthalocyanine catalysts.

Although the treatment step can be performed according to any of the methods taught in the art for contacting a liquid stream and a gas stream with a solid catalyst, the preferred system involves a fixed bed of the solid catalyst disposed in a treatment zone. The mixture of the water stream from the separating step, the fat aqueous bottom stream from the first scrubbing step and the third recycle water stream containing $NH_4HS$ and $(NH_4)_2S_2O_3$, is then passed through the treatment zone in either upward, radial, or downward flow with the oxygen-containing stream being passed into this zone in either concurrent or countercurrent flow relative to the mixture. The preferred mode of operation is downflow and concurrent flow. Because one of the products of the treatment step is elemental sulfur, there is a substantial catalyst contamination problem caused by the deposition of this elemental sulfur on the fixed bed of the catalyst. It is an essential feature of the present invention that the amount of oxygen injected into the treatment zone is carefully controlled so that the amount reacted is less than the stoichiometric amount required to oxidize all of the ammonium hydrosulfide contained in the various streams charged to this treatment step to elemental sulfur. Hence, it is required that oxygen is reacted in this step in a mol ratio less than 0.5 mol of $O_2$ per mol of $NH_4HS$ charged to this step, and preferably about 0.25 to about 0.45 mol of oxygen per mol of $NH_4HS$. The exact amount of oxygen within this range is selected such that sufficient sulfide remains available to react with the net sulfur production to form a water-soluble ammonium polysulfide—that is to say, it is required that sufficient excess sulfide be available to form a water-soluble polysulfide with the elemental sulfur which is the principal product of the primary oxidation reaction. Since one mol of sulfide will react with many mols of sulfur (typically, about 4 mols of sulfur per mol of sulfide), it is generally only necessary that a small amount of sulfide remain unoxidized.

An essential reactant for use in this treatment step is oxygen. This may be utilized in any suitable form either by itself or mixed with other relatively inert gases. In general, because of economic factors, it is preferred to utilize an air stream as the source of necessary oxygen in the treatment step of the present invention.

Regarding the conditions utilized in the treatment step of the present invention, it is preferred to utilize a temperature in the range of about 30° F. to about 400° F., with a temperature of about 80° F. to about 300° F. yielding best results. In fact, it is especially preferred to operate at a relatively low temperature since this minimizes ammonium sulfate formation. The sulfide oxidation reaction is not too sensitive to pressure and, accordingly, any pressure which maintains the liquid streams sufficiently in the liquid phase may be utilized. In general, it is preferred to operate at super atmospheric pressures in order to facilitate contact between the oxygen stream and the aqueous streams, and a pressure of about 1 p.s.i.g. to about 75 p.s.i.g. is particularly preferred. Additionally, the liquid hourly space velocity (defined to be the volume rate per hour of charging the combined liquid feed divided by the total volume of the catalyst bed is preferably selected from the range of about 0.1 to about 20.0 hr.$^{-1}$, with a value of about 1.0 to about 5.0 being preferred.

Following this treatment step, an effluent stream is withdrawn from the treatment zone. It contains ammonium polysulfide, $H_2O$, $NH_4OH$, $(NH_4)_2S_2O_3$, and a minor amount of other oxides of sulfur. In addition, it contains $N_2$ and typically some unreacted $NH_4HS$ and $O_2$. This stream is then passed into a separating zone and separated into a gas stream containing $N_2$, $H_2O$, $H_2S$ and $NH_3$ and a water stream containing ammonium polysulfide, $NH_4OH$ and $(NH_4)_2S_2O_3$. In some cases this water stream will also contain $NH_4HS$. This second separating step is preferably operated at substantially the same pressure and temperature utilized in the treatment step.

Thereafter, the water stream recovered from this second separating step is passed to a polysulfide decomposition step wherein the ammonium polysulfide is decomposed to yield $NH_3$, $H_2S$ and elemental sulfur. The preferred method for decomposing the polysulfide-containing stream involves subjecting it to conditions, including a temperature in the range of about 200° F. to about 350° F., sufficient to form an overhead stream comprising $NH_3$, $H_2S$ and $H_2O$ and a bottom water stream containing elemental sulfur and a minor amount of $(NH_4)_2S_2O_3$. In some cases, it is advantageous to accelerate the polysulfide decomposition reaction by stripping $H_2S$ from the polysulfide solution with the aid of a suitable inert gas, such as steam, air flue gas, etc. which can be injected into the bottom of the decomposition zone or by generating upflowing vapor in the decomposition zone by means of a reboiler or steam coil. In general, the decomposition zone is operated at a pressure of about 10 to about 100 p.s.i.g. with best results obtained in the range of about 15 to about 75 p.s.i.g.

When the temperature of the polysulfide decomposition zone is maintained at a value less than the melting point of sulfur, the bottom stream therefrom will contain a slurry of solid particles of the elemental sulfur. This stream is then, in a sulfur recovery step, subjected to any of the techniques taught in the art for removing a solid from a liquid, such as filtration, settling, centrifuging, etc. to effect the removal of the solid particles of the elemental sulfur. In the case where the bottoms temperature is maintained above the melting point of sulfur, the bottom stream will contain liquid sulfur which can be separated by a suitable settling step. It is to be noted that the separation of the liquid sulfur from the aqueous stream is quite rapid and by suitably adjusting the flow parameters within the polysulfide decomposition zone, the separation of the liquid sulfur phase can be performed if desired within the decomposition zone.

Regardless of how the sulfur is separated from the bottoms stream a water stream containing a minor amount of $(NH_4)_2S_2O_3$ is recovered from the sulfur separation step. The amount of $(NH_4)_2S_2O_3$ contained in this water stream is typically about 0.01 to about 1.0 wt. percent thereof calculated as elemental sulfur. It is to be noted that substantially all of the net ammonia which was charged to the decomposition step will be taken overhead in the polysulfide decomposition step, resulting in the water stream recovered from the sulfur separation step being substantially free of $NH_4OH$. In accordance with the present invention, the water streams recovered from the sulfur separation step is divided into a number of portions which are hereinafter employed in various scrubbing operations and for recycle purposes.

In order to prevent the loss of $H_2S$ and $NH_3$ in the nitrogen vent gas from the second separation step and to increase the yield of elemental sulfur, a first portion of the water stream recovered from the sulfur separation step is cooled and charged to a second scrubbing zone wherein intimate contacting between this stream and the nitrogen-containing gas stream produced in the second separating step is achieved. In general, this step is preferably operated at approximately the same pressure as the second separating step but at a lower temperature. Moreover, it is preferred to operate this second scrubbing step at liquid-gas loading sufficient to substantially remove $NH_3$ and $H_2S$ from this stream with formation of a nitrogen-rich overhead gas stream which is discharged from the process and an aqueous bottom stream containing $(NH_4)_2S_2O_3$, $NH_4OH$ and $NH_4HS$.

Likewise, a second portion of the water stream recovered from the sulfur separation step is cooled and contacted with the overhead vapor stream from the polysulfide decomposition step in a third scrubbing zone. Once again, countercurrent contacting is preferred in this third scrubbing step, and operation at the conditions approximately equal to those employed in the upper part of the polysulfide decomposition zone is the preferred mode. In addition, the loading of the liquid stream relative to the volumes of the vapor stream charged to this third scrubbing zone are preferably adjusted to form a substantially sulfide-free and thiosulfate-free overhead vapor stream which, after it is condensed, forms a substantially sulfide-free and thiosulfate-free water stream containing NH₄OH. The fat aqueous stream withdrawn from the bottom of the third scrubbing zone contains $(NH_4)_2S_2O_3$, $NH_4OH$ and $NH_4HS$.

After the scrubbing steps are performed the aqueous bottom streams recovered from the second and third scrubbing steps are combined to form the third recycle water stream which contains $(NH_4)_2S_2O_3$, $NH_4OH$ and $NH_4HS$. This stream contains substantially all of the unreacted sulfide which was present in the effluent from the treatment step plus a substantial proportion of the thiosulfate which was present in this effluent stream. The resulting mixture is then recycled to the treatment step in order to increase the yield of elemental sulfur and to provide ammonium thiosulfate for the purpose of controlling the side reaction leading to ammonium thiosulfate production. In general, it is preferred to inject this resulting mixture into the treatment zone at a plurality of points spaced along the direction of flow of the water stream through the treatment zone. More specifically, it is preferred to utilize this recycle stream as a quench medium for the exothermic reaction taking place in the treatment zone by suitably dividing the recycle stream into a number of portions, either after or before adjustment of the temperature of this stream to a level below that utilized in the treatment step, in order to facilitate control of the temperature rise across the treament zone. The techniques for accomplishing this temperature control via the use of quench streams is well known to those skilled in the art and will not be discussed here.

Turning to the overhead stream recovered from the upper region of the third scrubbing zone, it consists of, essentially, an aqueous ammoniacal solution which is substantially free of both ammonium thiosulfate and ammonium hydrosulfide. In accordance with the present invention this stream is condensed and the resulting liquid stream divided into a number of portions. The first portion of this aqueous ammoniacal stream is combined with a third portion of the water stream recovered from the sulfur separation step to produce the second recycle water stream. The stream contains $NH_4OH$ and $(NH_4)_2S_2O_3$. It is a feature of the present invention that only a minor amount of the overhead stream is utilized to form this second recycle stream so that the amount available for recycle to the water-contacting step of the hydrocarbon conversion process and for recovery as product is maximized. In sharp contrast with the results experienced when a thiosulfate-containing water stream is recycled to the water-contacting step of the hydrocarbon conversion process, the presence of ammonium thiosulfate in the scrubbing solution utilized in the hydrogen purification step has no adverse effects; and, consequently, a portion of the thiosulfate-containing stream can be utilized in the first scrubbing step with resulting substantial savings in the heat load on the polysulfide decomposition column.

Similarly, a second portion of the overhead stream recovered from the third scrubbing step constitutes the recycle stream to the water contacting step of the hydrocarbon conversion process and is used for the purpose of removing detrimental ammonium sulfide salts from the effluent heat transfer equipment train of the process as was explained hereinbefore. The remaining portion of the overhead stream from the third scrubbing zone is then recovered as an ammoniacal aqueous product stream and results in the removal of the net amount of ammonia and water from the combination system. In some cases, it is advantageous to further concentrate the ammonia product stream from this process by performing a suitable rectification step on this ammoniacal aqueous product stream to produce, for instance, a 28% aqueous ammonia stream as overhead and a purified water stream as bottoms.

Having broadly characterized the essential steps comprising the combination process of the present invention, reference is now had to the attached drawing for a detailed explanation of an example of a preferred flow scheme for use therein. The attached drawing is merely intended as a general representation of the flow scheme employed with no intent to give details about heaters, condensers, pumps, compressors, valves, process control equipment, etc., except where a knowledge of these devices is essential to the understanding of the present invention or would not be self-evident to one skilled in the art. In addition, in order to provide a working example of a preferred mode of the present invention, the attached drawings is discussed with reference to particular input streams and a preferred mode of operation for each of the steps of the present invention. Moreover, it is understood that the description given in conjunction with a discussion of the attached drawings refers to a combination process that has been started-up and is producing recycle streams.

Referring now to the attached drawings, a light gas oil enters the combination process through line 1. This light gas oil is commingled with a cycle stock at the junction of line 14 with line 1 and with a recycle hydrogen stream at the junction of line 9 with line 1. The resulting mixture is then heated via a suitable heating means, not shown, to the desired conversion temperature and then passed into hydrocarbon conversion zone 2. Analysis of the light gas oil shows it to have the following properties: an API gravity at 60° F. of 25°, an initial boiling point of 421° F., a 50% boiling point of 518° F., an end boiling point of 663° F., a sulfur content of 2.21 wt. percent, and a nitrogen content of 126 wt. p.p.m. Hydrogen is supplied via line 9 at a rate corresponding to a hydrogen recycle ratio of 10,000 standard cubic feet of hydrogen per barrel of oil charged to hydrocarbon conversion zone 2. The cycle stock which is being recycled via line 14 is a portion of the 400+ fraction of the product stream which is separated in product recovery system 12, as will be hereinafter explained.

The catalyst utilized in zone 2 comprises nickel sulfide combined with a carrier material containing silica and alumina in a weight ratio of about 3 parts of silica per part of alumina. The nickel sulfide is present in amounts sufficient to provide about 5.0 wt. percent of nickel in the final catalyst. The catalyst is maintained within zone 2 as a fixed bed of ⅛ in. by ⅛ in. cylindrical pills. The conditions utilized in zone 2 are hydrocracking conditions which include a pressure of about 1500 p.s.i.g., a conversion temperature of about 600° F., and a liquid hourly space velocity of about 2.0 based on combined liquid feed.

An effluent stream is then withdrawn from zone 2 via line 3 and mixed with a substantially thiosulfate-free first recycle water stream containing $NH_4OH$ at the junction of line 31, with line 3. The initial inventory of water circulating in the system is added, during startup, via line 32. The resulting mixture then is passed into cooling means 4 wherein the stream is cooled to a temperature of about 100° F. The cooled mixture is then passed via line 5 into the first separating zone, zone 6, which is maintained at a temperature of about 100° F., and a pressure of about 1,450 p.s.i.g. The amount of water injected into line 3 via line 31 is about 5 gallons of water per 100 gallons of oil. As explained hereinbefore, the reason for adding the water on the influent side of cooling means 4 is to insure that it does not become clogged with sulfide salts and to increase the efficiency of this cooling means.

In separating zone 6, a 3-phase system is formed. The gas phase comprises hydrogen, hydrogen sulfide, and a minor amount of light ends. The oil phase contains the reacted and unreacted hydrocarbons produced by the conversion reaction and a relatively minor amount of dissolved $H_2S$. The water phase contains about 3.1 wt. percent sulfur as ammonium hydrosulfide.

The hydrogen-rich gaseous phase is withdrawn from zone 6 via line 7 and passed into the first scrubbing zone, zone 8, wherein it is countercurrently contacted with a second recycle water stream containing NH₄OH and (NH₄)₂S₂O₃ entering the zone via line 39. Zone 8 is a vertically positioned tower containing fractionating plates which is operated at a temperature of 100° F., and a pressure of about 1,450 p.s.i.g. The volume loading of liquid relative to volumes of gas entering the bottom of zone 8 is adjusted to form a recycle hydrogen stream which is substantially free of H₂S, and an aqueous bottom stream containing NH₄HS and (NH₄)₂S₂O₃. This latter stream leaves the zone via line 41 at or near the bottom thereof. The aqueous bottom stream from zone 8 contains NH₄HS in an amount sufficient to provide about 5 wt. percent sulfur. The hydrogen stream withdrawn from the top of zone 8 via line 9 is commingled with a makeup hydrogen stream at the junction of line 9 with line 10 and the resulting mixture recycled via line 9 through suitable compressing means, not shown, to hydrocarbon conversion zone 2. The amount of makeup hydrogen supplied via line 10 is sufficient to compensate for the amount consumed within hydrocarbon conversion zone 2 and dissolved in the liquid stream withdrawn from zone 6. Because the H₂S has been substantially removed from this hydrogen stream, the amount of recycle compressor capacity necessary to maintain the same hydrogen partial pressure within zone 2 is substantially reduced.

The oil phase from separating zone 6 is withdrawn via line 11 and passed to product recovery system 12.

In this case, product recovery system 12 comprises a low pressure separating zone and a suitable train of fractionating means. In the low pressure separating zone, the hydrocarbon stream is flashed to a pressure of about 100 p.s.i.g. in order to remove light hydrocarbon therefrom and in order to strip out the relatively minor amount of dissolved H₂S from this oil stream. The resulting stripped hydrocarbon stream is fractionated to recover a gasoline boiling range product stream and a cycle oil comprising a portion of the stripped oil stream boiling range product stream and a cycle oil comprising a portion of the stripped oil stream boiling above 400° F. A gasoline product stream is recovered via line 13 and the cycle oil is recycled to hydrocarbon conversion zone 2 via line 14.

Returning to the water phase formed in separating zone 6, it is withdrawn via line 15 and commingled with the aqueous bottom stream from zone 8 at the junction of line 41 with line 15. The resulting mixture is passed via line 15 to line 16 where it is commingled with an air stream and passed into treatment zone 17.

Treatment zone 17 contains a fixed bed of a solid catalyst comprising cobalt phthalocyanine monosulfonate combined with an activated carbon carrier material in an amount such that the catalyst contains about 1.0 wt. percent of the phthalocyanine compound. The activated carbon granules used as the carrier material are in the size of 12 to 30 mesh. The amount of air which is charged to treatment zone 17 via line 16 is sufficient to react about 0.4 mol of oxygen per mol of total sulfide charged to treatment zone 17. In addition, a third recycle water stream containing NH₄HS, NH₄OH and (NH₄)₂S₂O₃ is charged to treatment zone 17 via line 42 and line 38. The points of injection of this recycle stream are spaced along the principal direction of flow of the water stream through treatment zone 17 in order to provide quench streams for the exothermic reaction taking place therein. The conditions utilized in treatment zone 17 are: an inlet temperature of about 140° F., an outlet temperature of about 185° F., a pressure of about 10 p.s.i.g., and a liquid hourly space velocity based on the combined liquid feed to treatment zone 17 of about 2.0 hrs.⁻¹.

As previously explained, the amount of oxygen reacted in treatment zone 17 is an amount less than the stiochiometric amount necessary to convert all of the sulfide to sulfur, and, consequently, ammonium polysulfide is formed within treatment zone 17. Accordingly, the effluent stream withdrawn from zone 17 via line 18 contains ammonium polysulfide, NH₄OH, (NH₄)₂S₂O₃, H₂O, N₂ and unreacted NH₄HS and O₂. This effluent stream is passed to the second separating zone, zone 19, wherein a two phase system forms. The gas phase formed in zone 19 contains N₂, H₂O, H₂S, NH₃ and unreacted O₂. This stream is withdrawn via line 20 and passed to zone 21. The conditions utilized in zone 19 are a pressure of about 5 p.s.i.g. and a temperature of about 185° F. The aqueous phase that forms in zone 19 contains ammonium polysulfide, NH₄OH, (NH₄)₂S₂O₃, and NH₄HS; it it withdrawn via line 23 and passed to polysulfide decomposition zone 24.

In this case, polysulfide decomposition zone 24 consists of a vertically positioned tower containing a plurality of fractionating plates and means for generating upflowing vapors such as a steam coil or reboiler near the bottom of the tower. The decomposition zone is maintained at a bottom temperature of about 280° F. and a bottom pressure of about 40 p.s.i.g. These conditions are sufficient to form an overhead vapor stream containing NH₃, H₂S and H₂O, which leaves the zone via line 25, and a bottom water stream containing a dispersion of liquid sulfur and a minor amount of (NH₄)₂S₂O₃. This bottom stream is passed via line 33 to sulfur recovery zone 34 wherein a two phase system is formed. The bottom phase consists of liquid elemental sulfur and the other phase consists of water containing a minor amount of (NH₄)₂S₂O₃. In general, the aqueous phase formed in sulfur recovery zone 34 is substantially free of sulfide and of NH₄OH. The liquid sulfur is withdrawn via line 35 and constitutes one of the product streams. Likewise, the aqueous phase containing ammonium thiosulfate is withdrawn via line 36, cooled by means not shown, and split into three portions by the manifolding innerconnecting line 36 with line 43, and line 39. The amount of ammonium thiosulfate contained in this water stream withdrawn from zone 34 will, during the course of the operation of the combination process build up to an equilibrium level; if desired a drag stream may be withdrawn via line 37 and makeup water added via line 31 in order to hold the amount of thiosulfate to a low level.

A first portion of the water stream recovered from the sulfur separation step is withdrawn from line 36 at the junction therewith with line 43 and charged to second scrubbing zone 21. Also charged to second scrubbing zone 21 is the gas stream withdrawn from zone 19 via line 20. As indicated hereinbefore, this gas stream consists of primarily nitrogen associated with NH₃, H₂S, O₂ and H₂O. The function of second scrubbing zone 21 is to remove the ammonia and hydrogen sulfide from this gas stream in order to increase the yield of elemental sulfur and ammonia from the combination process and, also, to minimize the risk of air pollution when this nitrogen stream is vented from the system. Zone 21 is a vertically positioned contacting tower containing fractionation plates. The conditions maintained within this zone are: a temperature of about 100° F. and a pressure of about 5 p.s.i.g. In general, the liquid gas loading on this zone is selected so that at least about 95% of the NH₃ and H₂S are removed from this gas stream to produce an overhead stream consisting primarily of nitrogen which is discharged from the system and an aqueous bottom stream containing (NH₄)₂S₂O₃, NH₄HS and NH₄OH. The gas stream is vented from the zone via line 22 and the bottom stream is withdrawn via line 44.

A second portion of the water stream withdrawn from zone 34 is passed via line 36 to third scrubbing zone 26 wherein it is countercurrently contacted with the vapor stream withdrawn from zone 24 via line 25. The function of zone 26 is to scrub H₂S from the overhead vapor stream produced by the decomposition of the ammonium polysulfide. The conditions maintained within zone 26 are approximately the same as those utilized in the upper portion of zone 24: that is, approximately a temperature of about 260° F., and a pressure of about 30 p.s.i.g. Once again, zone 26 is a vertically positioned tower containing a plurality of fractionating plates to insure the achievement of intimate contact between the vapor stream and the liquid stream. The liquid to gas loading on zone 26 is adjusted to produce a substantially sulfide-free overhead stream which is withdrawn from zone 26 via line 27 and condensed by suitable cooling means, not shown, to form a substantially sulfide-free and thiosulfate-free overhead stream containing $NH_4OH$ and $H_2O$. A fat aqueous bottom stream containing $(NH_4)_2S_2O_3$, $NH_4HS$ and $NH_4OH$ is withdrawn from zone 26 via line 42. It is to be noted that in some cases by a suitable adjustment of flow parameters through a vertically positioned tower having a plurality of fractionating plates, zone 26, zone 24, and zone 34 can be three separate regions within one fractionating tower if a suitable baffling is provided; however, for purposes of discussion here, these three zones have been illustrated as being separate columns.

Irrespective of the details concerning the operation of zone 26 and zone 21, the aqueous bottom streams withdrawn from the lower regions thereof are combined at the junction of line 42 with line 44 to form the third recycle water stream. This stream contains $NH_4OH$, $(NH_4)_2S_2O_3$ and $NH_4HS$ and is then recycled to treatment zone 17 via line 42 and line 38 as previously explained. The amount of $NH_4HS$ contained in this recycle stream is substantially an amount equivalent to the amount of unreacted sulfide contained in the effluent stream withdrawn from treatment zone 17. Similarly, the amount of ammonium thiosulfate contained in this recycle stream is, when added with the amount entering treatment zone 17 via line 15 approximately equal to the amount withdrawn from treatment zone 17 via line 18.

Returning to the aqueous stream withdrawn from zone 34, a third portion thereof is withdrawn at the junction of line 36 with line 39 and combined with a first portion of the overhead stream withdrawn from zone 26 via line 27 and line 40 at junction of line 40 with line 39. The reason for adding a portion of this overhead stream is to add ammonia to the resulting mixture in order to increase its capability to scrub $H_2S$ from the hydrogen recycle gas. The resulting combined stream is the second recycle water stream containing $NH_4OH$ and $(NH_4)_2S_2O_3$ which is passed by means of suitable pumping means, not shown, via line 39 to the upper regions of first scrubbing zone 8 wherein it is countercurrently contacted with the hydrogen-containing gas stream withdrawn from separation zone 6 as previously explained.

A second portion of the overhead stream recovered from zone 26 is withdrawn therefrom via line 27 and line 31 and charged to the water-contacting step of the hydrocarbon conversion process at the junction of line 31 and line 3, as previously discussed.

The final portion of the overhead water stream from zone 26 is withdrawn therefrom via line 27 and passed to ammonia recovery zone 28 which is a conventional rectifying column designed to produce an ammonia concentrate, which is recovered via line 29, and a relatively pure water stream, which is recovered via line 30. A portion of this last water may be used for makeup water if desired and as such it is reintroduced into the system via line 32.

I claim as my invention:

1. A combination process for converting a hydrocarbon charge stock containing sulfurous and nitrogenous contaminants and for simultaneously recovering elemental sulfur and an ammoniacal aqueous stream, said process comprising the steps of:
   (1) contacting the hydrocarbon charge stock and a hydrogen stream with a hydrocarbon conversion catalyst at conversion conditions sufficient to form an effluent stream containing substantially less sulfurous and nitrogenous contaminants; hydrocarbons, hydrogen, $NH_3$ and $H_2S$, the effluent stream containing substantially more mols of $H_2S$ than $NH_3$;
   (2) mixing a first recycle water stream containing $NH_4OH$ and being substantially thiosulfate-free with the effluent stream from step (1);
   (3) cooling and separating the resulting mixture to form a gas stream containing $H_2$ and $H_2S$, a hydrocarbon stream, and a water stream containing $NH_4HS$;
   (4) contacting, in a first scrubbing zone, the gas stream from step (3) with a second recycle water stream containing $NH_4OH$ and $(NH_4)_2S_2O_3$ to form an overhead hydrogen stream which is substantially free of $H_2S$ and an aqueous bottom stream containing $NH_4HS$ and $(NH_4)_2S_2O_3$;
   (5) commingling the hydrogen stream from step (4) with a makeup hydrogen stream and passing the resulting mixture to step (1);
   (6) contacting a mixture of the water stream from step (3), the aqueous bottom stream from step (4), an air stream, and a third recycle water stream containing $NH_4OH$, $NH_4HS$ and $(NH_4)_2S_2O_3$ with a solid catalyst at oxidizing conditions sufficient to produce an effluent stream containing ammonium polysulfide, $NH_4OH$, $(NH_4)_2S_2O_3$, $H_2O$, $N_2$ and unreacted $NH_4HS$;
   (7) separating the effluent stream from step (6) into a gas stream containing $N_2$, $H_2O$, $H_2S$ and $NH_3$ and a water stream containing ammonium polysulfide, $NH_4OH$, and $(NH_4)_2S_2O_3$;
   (8) subjecting the water stream from step (7) to polysulfide decomposition conditions effective to produce an overhead vapor stream containing $NH_3$, $H_2S$ and $H_2O$ and a bottom water stream containing elemental sulfur and $(NH_4)_2S_2O_3$;
   (9) separating sulfur from the bottom stream from step (8) to form a water stream containing a minor amount of $(NH_4)_2S_2O_3$;
   (10) contacting a first portion of the water stream from step (9) with the gas stream from step (7), in a second scrubbing zone, to form a nitrogen-rich overhead gas stream and an aqueous bottom stream containing $(NH_4)_2S_2O_3$, $NH_4OH$, and $NH_4HS$;
   (11) contacting, in a third scrubbing zone, a second portion of the water stream from step (9) with the overhead vapor stream from step (8) to form a substantially sulfide-free and thiosulfate-free overhead stream containing $NH_4OH$ and $H_2O$ and an aqueous bottom stream containing $NH_4OH$, $(NH_4)_2S_2O_3$ and $NH_4HS$;
   (12) combining the bottom streams from steps (10) and (11) to form said third recycle water stream and recycling same to step (6);
   (13) combining a third portion of the water stream from step (9) with a first portion of the overhead stream from step (11) to form the second recycle water stream and passing same to step (4);
   (14) recovering a second portion of the overhead stream from step (11) as the first recycle water stream and passing same to step (2); and,
   (15) recovering the remaining portion of the overhead stream from step (11) as an ammoniacal aqueous product stream.

2. A combination process as defined in claim 1 wherein said hydrocarbon conversion catalyst comprises a metallic component selected from the metals and compounds of the metals of Group VI–B and Group VIII combined with a refractory inorganic oxide carrier material.

3. A combination process as defined in claim 2 wherein said hydrocarbon charge stock boils above the gasoline range and wherein said conversion conditions are hydrocracking conditions.

4. A combination process as defined in claim 2 wherein said hydrocarbon charge stock boils in the range of about 100° F. to about 600° F. and wherein said conversion conditions are hydrorefining conditions.

5. A combination process as defined in claim 1 wherein said solid catalyst utilized in step (6) is a phthalocyanine catalyst.

6. A combination process as defined in claim 1 wherein the solid catalyst utilized in step (6) comprises an iron group metallic sulfide combined with a carrier material.

7. A combination process as defined in claim 1 wherein the solid catalyst utilized in step (6) is cobalt phthalocyanine monosulfonate combined with an activated carbon carrier material.

8. A combination process as defined in claim 1 wherein the amount of oxygen contained in the air stream charged to step (6) is sufficient to react about 0.25 to about 0.45 mol of oxygen per mol of sulfide charged to said step.

9. A combination process as defined in claim 1 wherein the oxidizing conditions utilized in step (6) include a temperature of about 80 to about 300° F., a pressure of about 1 to about 75 p.s.i.g., and a liquid hourly space velocity, based on the combined liquid feed, of about 0.1 to about 20.0 hrs.$^{-1}$.

10. A combination process as defined in claim 1 wherein the polysulfide decomposition conditions utilized in step (8) include a temperature of about 200 to about 350° F. and a pressure of about 15 to about 75 p.s.i.g.

References Cited

UNITED STATES PATENTS

| | | | |
|---|---|---|---|
| 3,536,618 | 10/1970 | Urban et al. | 23—193 |
| 3,536,619 | 10/1970 | Urban et al. | 23—193 |
| 3,547,585 | 12/1970 | Urban | 23—224 |
| 3,558,272 | 1/1971 | Urban | 23—224 |
| 3,108,081 | 10/1963 | Gleim et al. | 252—428 |
| 3,457,046 | 7/1969 | Hoekstra | 23—224 |

OSCAR R. VERTIZ, Primary Examiner

H. S. MILLER, Assistant Examiner

U.S. Cl. X.R.

23—220, 224; 210—63